United States Patent
Kashnow

[11] 3,912,369
[45] Oct. 14, 1975

[54] SINGLE POLARIZER REFLECTIVE LIQUID CRYSTAL DISPLAY

[75] Inventor: Richard A. Kashnow, Schenectady, N.Y.

[73] Assignee: General Electric Company, Schenectady, N.Y.

[22] Filed: July 2, 1974

[21] Appl. No.: 485,304

[52] U.S. Cl. ............................ 350/160 LC; 350/150
[51] Int. Cl.² ........................................... G02F 1/13
[58] Field of Search ..................... 350/160 LC, 150

[56] References Cited
UNITED STATES PATENTS

| | | |
|---|---|---|
| 3,592,527 | 7/1971 | Conners et al. ............... 350/160 LC |
| 3,756,694 | 9/1973 | Soref et al. ..................... 350/160 LC |
| 3,784,280 | 1/1974 | Bigelow .............................. 350/150 |

*Primary Examiner*—Edward S. Bauer
*Attorney, Agent, or Firm*—Daniel R. Levinson; Joseph T. Cohen; Jerome C. Squillaro

[57] ABSTRACT

A liquid crystal display is disclosed comprising a polarizer, a liquid crystal cell, a quarter wave plate and a reflector. In one embodiment, negative dielectric anisotropy liquid crystal materials are utilized in the cell. In another, positive dielectric anisotropy materials are utilized.

15 Claims, 7 Drawing Figures

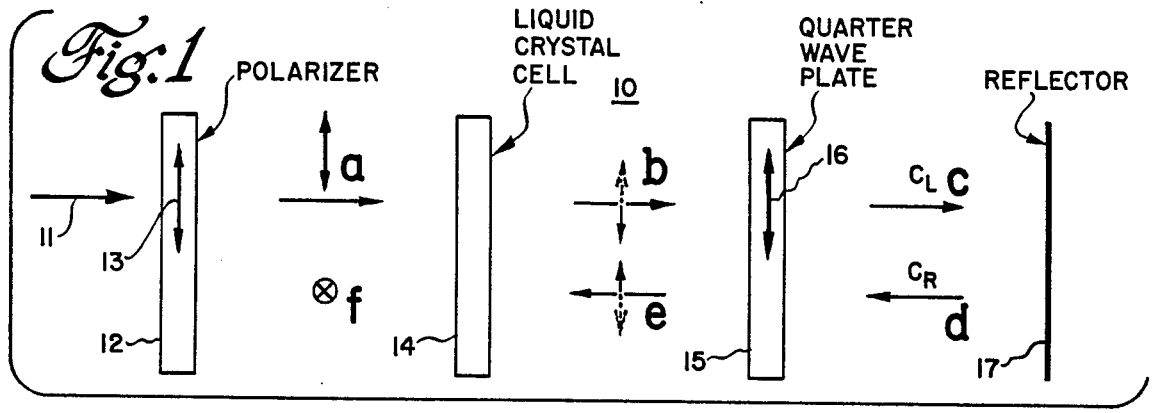
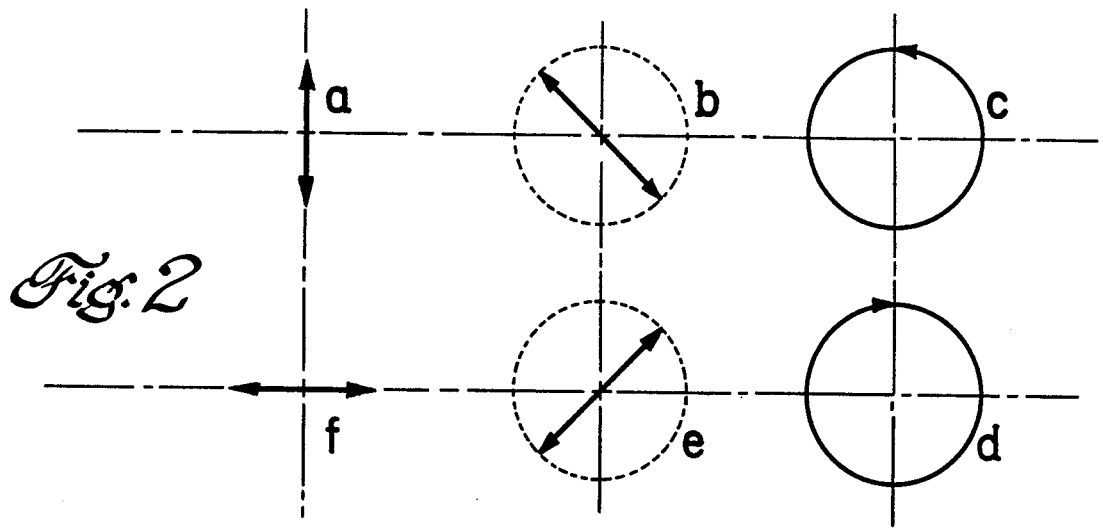
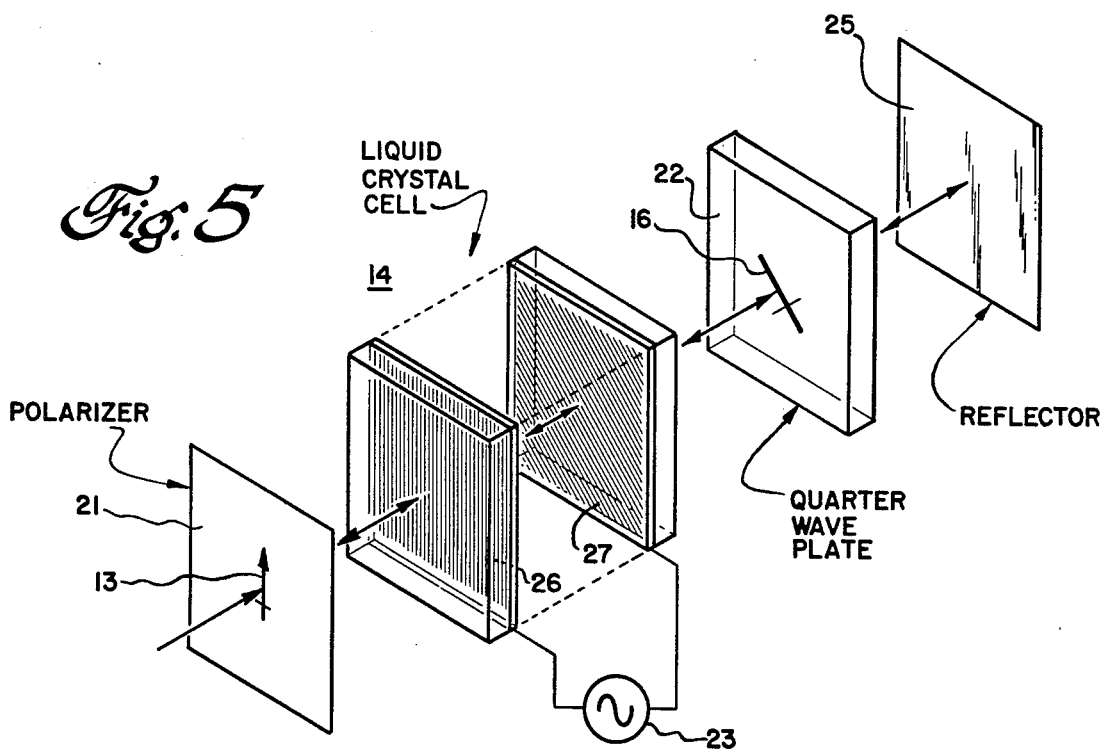

SINGLE POLARIZER REFLECTIVE LIQUID CRYSTAL DISPLAY

This invention relates to liquid crystal display devices and, in particular, to display devices utilizing liquid crystal materials and wave rotation phenomena.

In the last decade, the recognition of liquid crystal materials as useful in display device applications has resulted in the proliferation of a wide variety of display devices based upon the modulation of light by liquid crystal materials. Generally, the art may be divided into 1) peripheral electronics, for driving the display, 2) the display device per se, and 3) materials per se. The present invention relates to the display device per se.

In the prior art, older displays primarily relied on dynamic scattering or, specifically, the electrohydrodynamic instability of negative dielectric anisotropy materials.

More recently, displays have relied on wave rotation phenomena to obtain operation at lower power consumption; an absorptive, rather than a scattering, light modulation, which is more esthetically pleasing; and higher contrast. For example, by using a positive dielectric anisotropy, twisted nematic material between polarizers, light can be transmitted or absorbed in any desired pattern to display information. While increasing contrast, the overall brightness of the display is reduced somewhat due to the absorption of light by the polarizers. It is, therefore, highly desirable to retain the improved contrast and other advantages of wave rotation based devices while eliminating at least one polarizer.

In view of the foregoing, it is therefore an object of the present invention to provide an improved display utilizing a liquid crystal cell and wave rotation phenomena.

Another object of the present invention is to provide an improved liquid crystal reflective display.

A further object of the present invention is to provide an improved liquid crystal display utilizing a single polarizer.

The foregoing objects are achieved in the present invention wherein a liquid crystal cell and a quarter wave plate are positioned between a polarizer and a reflecting surface, with the major surfaces thereof approximately parallel, i.e., the surfaces through which the light passes as the display is used. The liquid crystal cell contains material having, in one operating condition, a twisted molecular structure of 45° twist. In a preferred embodiment, the easy axis of the entrance face of the liquid crystal cell, and the axes of the polarizer and quarter wave plate are all parallel.

A more complete understanding of the present invention can be obtained by considering the following detailed description in conjunction with the accompanying drawings, in which:

FIG. 1 schematically illustrates a display device in accordance with the present invention.

FIG. 2 illustrates the operation of the present invention as each element interacts with the light incident thereon.

FIG. 5 illustrates a preferred embodiment of the present invention.

Figure 3:
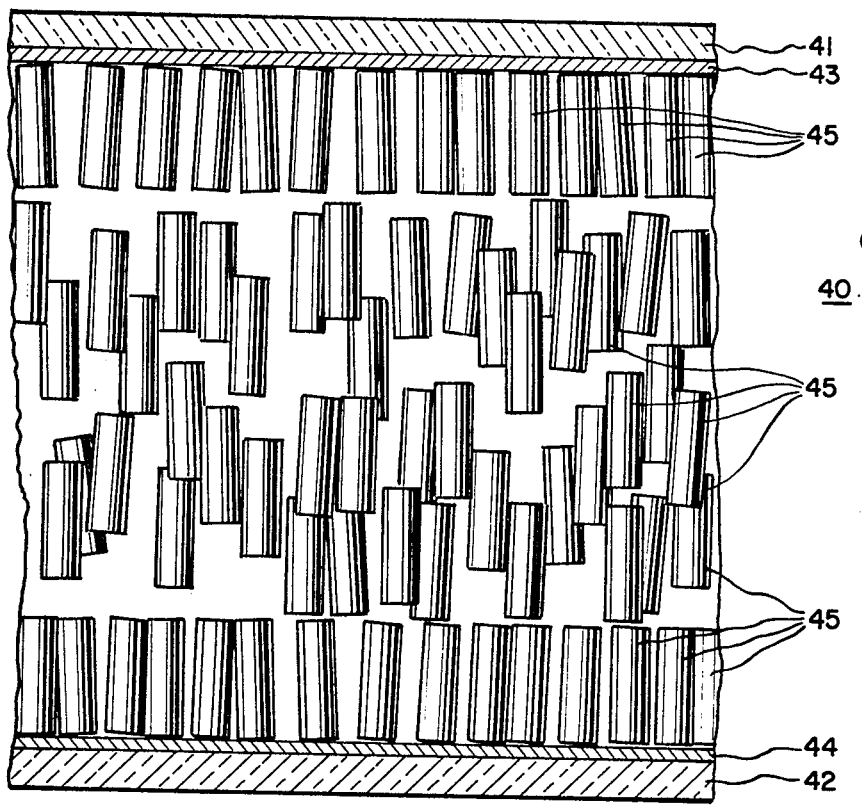
FIG. 3 illustrates an embodiment of a liquid crystal cell in the quiescent state.

FIG. 1 schematically illustrates the various elements of a display in accordance with the present invention and their effect upon light incident thereon. While the present invention is illustrated as comprising a number of elements spaced apart, it is understood that the elements are preferably in optical contact with each other; i.e., suitable coatings, known in the art, are utilized to reduce or eliminate reflections at the interfaces between the elements.

Specifically, ambient light incident upon the display in accordance with the present invention, illustrated by arrow 11, passes sequentially through polarizer 12, liquid crystal cell 14, quarter wave plate 15, whereupon it is reflected by reflector 17 returning through the elements in the reverse order. Depending upon the alignment of the elements, the light reflected by reflector 17 is either transmitted or absorbed by polarizer 12.

Polarizer 12 may comprise any suitable polarizing medium such as a glass or a plastic sheet containing aligned dichroic dye. Also, while it is known in the art to include dichroic dye in a liquid crystal cell to achieve the function of a polarizer, it is preferred that polarizer 12 be a discrete element since the alignment of the dye molecules is more complete. Polarizer 12 is characterized by a transmission axis 13. Incident light linearly polarized parallel to axis 13 is transmitted by polarizer 12.

Liquid crystal cell 14 comprises a negative dielectric anisotropy, twisted nematic liquid crystal material. In addition, the liquid crystal materials utilized have a homeotropic boundary condition in the quiescent state and a homogeneous, twisted nematic molecular alignment in the bulk in the active state.

Considering the left-hand side of liquid crystal cell 14, as illustrated in FIG. 1, as the entrance face, it is preferred that the easy axis of the entrance face be parallel to axis 13 of polarizer 12. The easy axis or preferred orientation induced by the exit face of liquid crystal 12 is rotated therefrom by 45°. For the specific example illustrated in FIGS. 1 and 2, it is assumed that the liquid crystal cell induces a left-hand, 45° twist. The twist may be either left-handed or right-handed.

Quarter wave plate 15 is more properly called a phase retardation plate, generally comprising a birefringent medium having a slow axis and a fast axis. As known by those in the optics art, a birefringent medium has two indices of refraction depending upon the direction of polarization of the light passing through the medium. The difference in the indices of refraction ($\Delta n$) times the thickness of the medium, $t$, determines the amount of optical path difference or relative phase retardation exhibited by the medium. Thus, the thickness of the medium is chosen relative to the birefringence such that $(\Delta n)t$ is equal to a quarter wavelength of light. Generally a value for the wavelength of light in the middle of the visible spectrum is chosen so that the product $(\Delta n)t$ is equal to about 1,400 Angstroms.

An additional characteristic of birefringent mediums in that incident polarized light is converted to elliptically polarized light. It is understood that in this discussion elliptical is intended in its mathematical sense, wherein a circle and a straight line are special cases. As known by those of skill in the art, linearly polarized light incident upon a quarter wave phase retardation plate at 45° from the axes is converted into circularly polarized light. Linearly polarized light incident upon the birefringent medium along either the fast or the slow axis is transmitted as linearly polarized light. For situations between 0° and 45°, linearly polarized, incident light is converted into elliptically polarized light.

Quarter wave plate 15 may comprise any suitable medium exhibiting the characteristics noted above. For example, as known in the art, a cleaved crystal of mica may be used. An alternative is a stretched sheet of transparent polymer, for example, such as commercially available from Polaroid Corporation.

As is known, a liquid crystal cell exhibits birefringent characteristics; however, it is preferred to use a single component quarter wave plate rather than an additional liquid crystal cell as a quarter wave plate in order to simplify the construction of a display in accordance with the present invention.

Reflector 17 may comprise a metal film deposited on a separate glass substrate or a metal film deposited on the rear surface of quarter wave plate 15. The reflection by reflector 17 may be specular (as a household mirror) or diffuse. As is known, utilizing a specular mirror provides a reflection of the viewer or his surroundings which may be disconcerting in reading the display. Thus, a diffuse reflection may be preferred depending upon the use of the display. This can be obtained, for example, by providing a thin diffusion layer on the right-hand side of quarter wave plate 15, as illustrated in FIG. 1, and coating the diffusion layer with a metal, reflecting layer, e.g., aluminum. It is understood that the diffusion must not be so great as to cause depolarization of the reflected light.

FIG. 2 illustrates the polarization of the light as it interacts with the various elements of the present invention. FIG. 2 illustrates the polarization as the device would be viewed end-on, from the left, as illustrated in FIG. 1. It is understood, of course, that FIG. 2 illustrates the operation of each element of the present invention; the actual display is simply light or dark in accordance with the pattern formed on the electrodes of liquid crystal cell 14. The mechanical fabrication of liquid crystal cells generally is itself well known to those of skill in the art.

Referring to both FIGS. 1 and 2, incident light 11 is absorbed by polarizer 12 except for polarization components parallel to transmission direction 13. The light transmitted by polarizer 12 is linearly polarized in the direction parallel to axis 13, as indicated by arrow $a$ and the symbol thereabove. In the active state, liquid crystal cell 14 rotates the plane of polarization of the incident light through 45°, as illustrated by arrow $b$ and the waveform associated therewith. Quarter wave plate 15, illustrated as having an axis thereof parallel to axis 13, converts the linearly polarized light, incident at an angle of 45° relative to axis 16, to circularly polarized light.

For the sake of the specific example illustrated in FIGS. 1 and 2, it is assumed that axis 16 represents the fast axis of quarter wave plate 15. Thus, light incident as illustrated by arrow $b$ is converted to left-hand, circularly polarized light. The representation in FIG. 2 of the left-hand oriented circularly polarized light as being counterclockwise is arbitrary.

Reflector 17 reverses the sense of direction of the circularly polarized light as illustrated by arrow $d$ and the symbol associated therewith. Re-entering quarter wave plate 15, the circularly polarized light is converted to linearly polarized light. However, as indicated by arrow $e$ and the symbol associated therewith, the plane of polarization is orthogonal to the plane of polarization of the light entering quarter wave plate 15 from liquid crystal cell 14. The light entering liquid crystal cell 14 from quarter wave plate 15 is rotated through 45° and is incident upon polarizer 12 with the plane of polarization thereof orthogonal to axis 13. Thus, the reflected light is substantially extinguished by polarizer 12. The display appears dark to a viewer.

When liquid crystal cell 14 is in the quiescent state, there is no twisted molecular structure to provide wave rotation. Thus, the linearly polarized light from polarizer 12 is incident upon quarter wave plate 15 parallel to axis 16 and is transmitted by quarter wave plate 15 as linearly polarized light. The light reflected from mirror 17 is transmitted by quarter wave plate 16 with the direction of polarization the same as it was leaving liquid crystal cell 14. Liquid crystal cell 14 transmits the light, without rotation, to polarizer 12. Since there has been no rotation, the display appears bright in the quiescent areas.

Device 10, as thus described, provides a display of dark information on a bright background as determined by the relative positioning of axes 13 and 16 and the preferred orientation induced by the entrance face of liquid crystal cell 14. While this type of display is preferred, other combinations of orientations of elements 12, 14 and 15 are possible, all of which produce elliptically polarized light incident upon reflector 17.

Considering one of these additional combinations, quarter wave plate 15 may have axis 16 thereof oriented parallel to the easy axis of the exit face of liquid crystal cell 14, i.e., at 45° to the direction of polarization. In this situation, for the active state, ambient light 11 incident upon liquid crystal cell 14 is linearly polarized and emerges from cell 14 linearly polarized parallel to axis 16 of quarter wave plate 15. Thus, quarter wave plate 15 transmits the light as linearly polarized. Reflection by reflector 17 does not alter the orientation of the plane of linear polarization and the light re-enters liquid crystal cell 14 in the same state at which it left. Liquid crystal cell 14 rotates the plane of polarization back through 45° to a polarization state parallel to axis 13. Thus, in the active state the display now appears light.

In the quiescent state, liquid crystal cell 14 does not rotate the incident, linearly polarized light, which therefore is incident upon quarter wave plate 15 at 45° relative to axis 16. The light is thus converted to circularly polarized light, the sense of rotation of which is reversed by reflector 17. The circularly polarized light is then converted by quarter wave plate 15 into linearly polarized light with its polarization state orthogonal to that of the light passing from liquid crystal cell 14 to quarter wave plate 15. In its quiescent state, liquid crystal cell 14 does not rotate the polarization direction of the reflected light. Thus, polarizer 12 absorbs the reflected light and the display appears dark in the quiescent state.

As previously noted, liquid crystal cell 14 may exhibit either left-hand or right-hand twist. The handedness of the twist determines, in part, the sense of rotation of the elliptical polarized light transmitted by quarter wave plate 15. The sense of rotation of the elliptically polarized light is also affected by the quadrant, as determined by the fast and slow axes, in which it is incident upon quarter wave plate 15.

Figure 4:
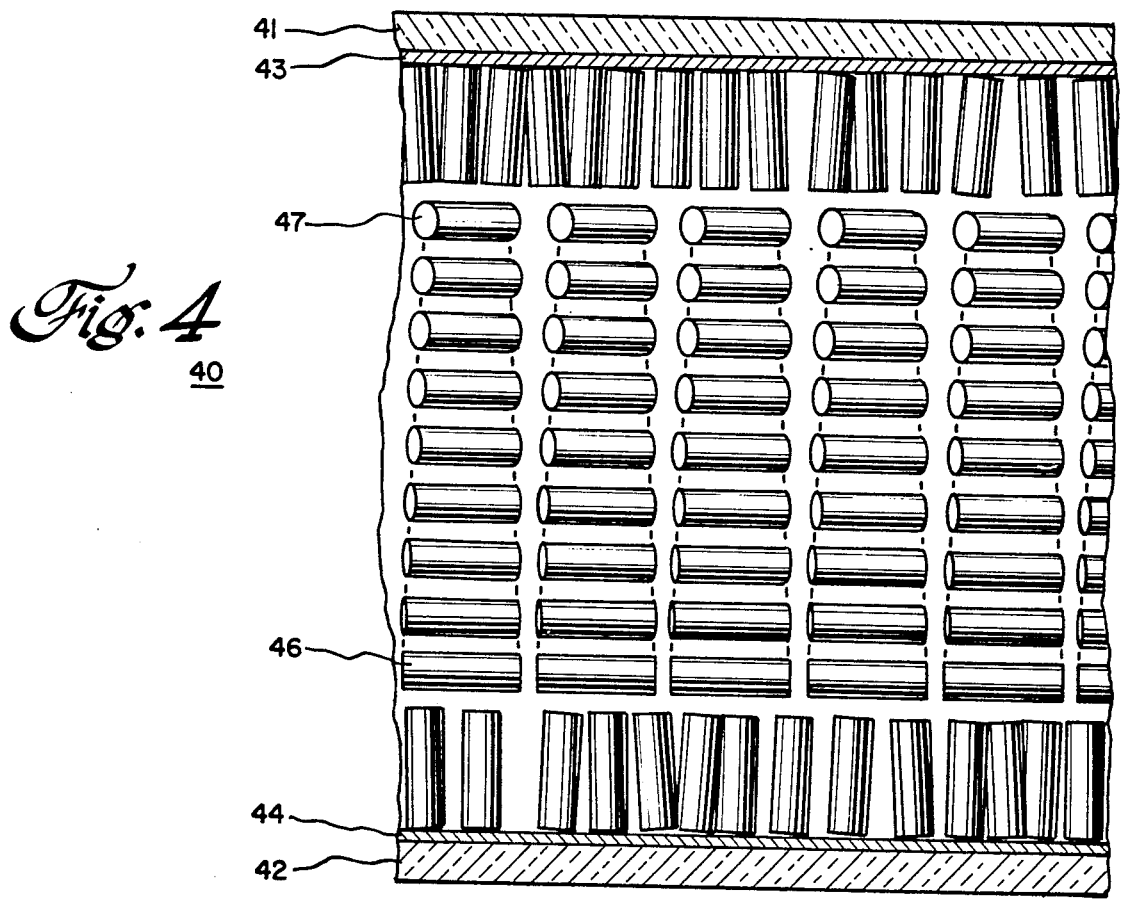
FIG. 4 illustrates the embodiment of a liquid crystal cell in the active state.

FIGS. 3 and 4 illustrate the operation of the liquid crystal cell containing a negative dielectric anisotropy, nematic liquid crystal characterized by a quasihomeotropic boundary condition and a twisted molecular structure in the bulk in the active state.

Specifically, in FIG. 3, liquid crystal device 40 comprises a first, transparent boundary substrate 41, the interior side of which is covered by a transparent conductive electrode 43 which may, for example, comprise a thin layer of indium oxide or tin oxide. While illustrated as completely covering substrate 41, electrode 43 may be patterned to display the desired information. A second transparent boundary substrate 42 is positioned opposite substrate 41, approximately parallel therewith, and is also covered by a transparent conductive electrode 44, which also may be patterned as desired.

Since the mechanical fabrication of liquid crystal devices is well known in the art, suitable sealing surfaces about the periphery of substrates 44 and 12 are not illustrated. However, with these sealing surfaces in place, a volume is defined between substrates 41 and 42 which is filled with a negative dielectric anistropy, nematic liquid crystal material, such as MBBA. Liquid crystal materials are typically characterized by an elongated molecule such as molecule 45. In accordance with the present invention, a homeotropic boundary condition is provided so that the elongated molecules, represented by molecule 45, arrange themselves with the long axes thereof approximately perpendicular to substrates 41 and 42. The homeotropic boundary condition is obtained, for example, by the addition of a homeotropic dopant to the negative dielectric anisotropy nematic liquid crystal. Suitable dopants, of the monopolar type, include lecithin and hexadecyltrimethylammonium sulfate. Typically, two percent or less, by weight of dopant is utilized.

An alternative to the addition of a homeotropic dopant to the liquid crystal material is to deposit an oriented adsorbate (surfactant) by the Blodgett-Langmuir monolayer deposition method in which an approximately homeotropic boundary condition is obtained due to optimization of packing densities. The boundary condition is approximately homeotropic in that the molecules have a slight tilt, i.e., less than about 10° from the normal. As used herein, "quasi-homeotropic" includes both perpendicular and tilted molecular alignments.

The adsorbate, which may, for example, comprise hexadecyltrimethylammonium bromide is oriented by the direction of withdrawal of the substrate from the trough. By orienting the adsorbate, a preferred or easy axis is provided that causes the liquid crystal molecules to align themselves parallel to the easy axis in the active state.

Alternatively, an easy axis can be induced by unidirectionally rubbing or grooving the substrates or by the evaporation of a thin film at an oblique angle incident to the substrate. The latter also induces some tilting of the molecules as noted with the Blodgett-Langmuir monolayer deposition. The tilting does not produce a visible effect in the quiescent state. Suitable materials for the thin film include silicon monoxide, platinum, aluminum, and gold.

Any suitable alternative, producing the desired boundary conditions, may be used.

FIG. 4 illustrates the liquid crystal device in accordance with the present invention in the active state in which a suitable excitation voltage is applied to electrodes 43 and 44. This causes the molecules of the nematic liquid crystal to realign themselves, in the bulk, predominantly parallel to the substrates and in a preferred orientation along the easy axis. As illustrated in FIG. 5, the easy axes of the substrates are rotated 45° i.e., molecules, such as molecule 16, align in a direction parallel to the plane of the drawing when adjacent substrate 12 and align, as molecule 17, 45° to the plane of the drawing when adjacent substrate 11. In between, the molecules undergo a twist in preferred direction as one proceeds through the cell from one boundary to the other. Thus, in the active state, a twisted nematic structure is provided which can be used as a wave rotation device for changing the orientation of polarized light. Intermolecular forces between the liquid crystal molecules in contact with the substrate and the molecules of the substrate far exceed the aligning force of the applied field so that a quasi-homeotropic boundary is retained. The visible effect, however, is one of a homogeneous boundary of preferred orientation producing a twisted nematic structure.

It will be appreciated by those of skill in the art in considering FIGS. 3 and 4 together that the operation of the liquid crystal device in accordance with the present invention is the opposite of liquid crystal devices of the prior art. Specifically, a homeotropic, rather than a homogeneous, boundary condition is obtained in the quiescent state. Further, this embodiment of the present invention differs from the electro-optical effect known as DAP, an acronym for "Deformation of Aligned Phases," in which an initially homeotropic structure of negative dielectric anisotropy nematic liquid crystal material is deformed by the application of an electric field in order to achieve a voltage modulated phase retardation. The present invention differs from the DAP effect in that the material of the present invention has a twist in the active state which, as previously noted, is utilized to provide wave rotation of polarized light.

Any negative dielectric anisotropy, nematic liquid crystal material can be utilized. It is preferred that the material have relatively high resistivity so that virtually any frequency can be utilized from source 23. As is known in the art, negative dielectric anisotropy nematic liquid crystal materials are electrohydrodynamically unstable, inducing dynamic scattering, when the applied frequency is less than a critical frequency proportional to the conductivity of the material. For example, relatively pure MBBA [N-(p-methoxybenzylidine)-p-(n-butyl)aniline] has a high resistivity and thus can be used in the present invention with an applied frequency as low as 30 hertz, or lower.

FIG. 5 illustrates an isometric view of a display device in accordance with the present invention, and in particular illustrates an embodiment of the present invention utilizing positive dielectric anisotropy liquid crystal materials. Specifically, liquid crystal cell 14 comprises a positive material having a homogeneous boundary condition. As is known in the art, the liquid crystal molecules can be induced to assume a preferred orientation in the liquid crystal cell by rubbing or suitable treating the inner sides of the boundary substrates.

The induced preferred orientations or easy axes 26 and 27 are displaced 45 degrees relative to each other to induce a twist in the molecules of liquid crystal material. Various treatments of the inner surfaces can be utilized to obtain preferred orientations 26 and 27. For example, oblique evaporation of thin films, such as silicon monoxide, may be used to establish preferred alignment direction on the boundary substrates. As is known in the art, evaporation at some oblique angles may result in alignment of the liquid crystal molecules at a slight tilt with respect to the boundary substrate planes. This type of homogeneous boundary condition is also suitable for use in the present invention.

Liquid crystal cell 14 may comprise any suitable twisted nematic, positive dielectric anisotropy liquid crystal material such as, but not limited to, 4-cyano-4'-pentylbiphenyl, or suitable mixture of positive dielectric anisotropy materials with negative anisotropy materials, such as, but not limited to, ten percent by weight PEBAB [N-(p-ethoxybenzylidene)-p-aminobenzonitrile] with ninety percent by weight MBBA [N-(p-methoxybenzylidene)-p-(n-butyl) analine]; or mixtures of two or more positive dielectric anisotropy materials, such as 4-cyano-4'-pentylbiphenyl and 4-cyano-4'heptylbiphenyl.

Figure 6:
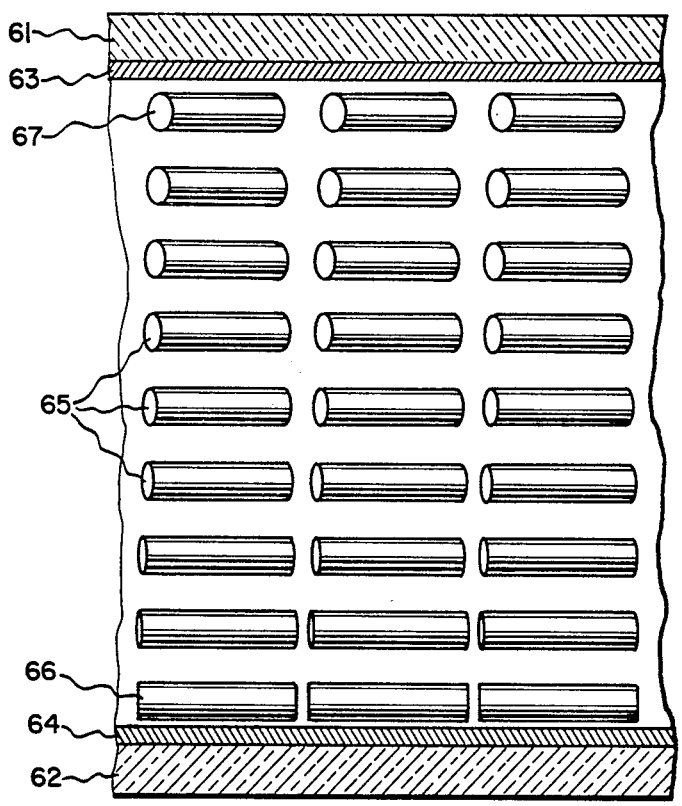
FIG. 6 illustrates another embodiment of the present invention in the quiescent state.
Figure 7:
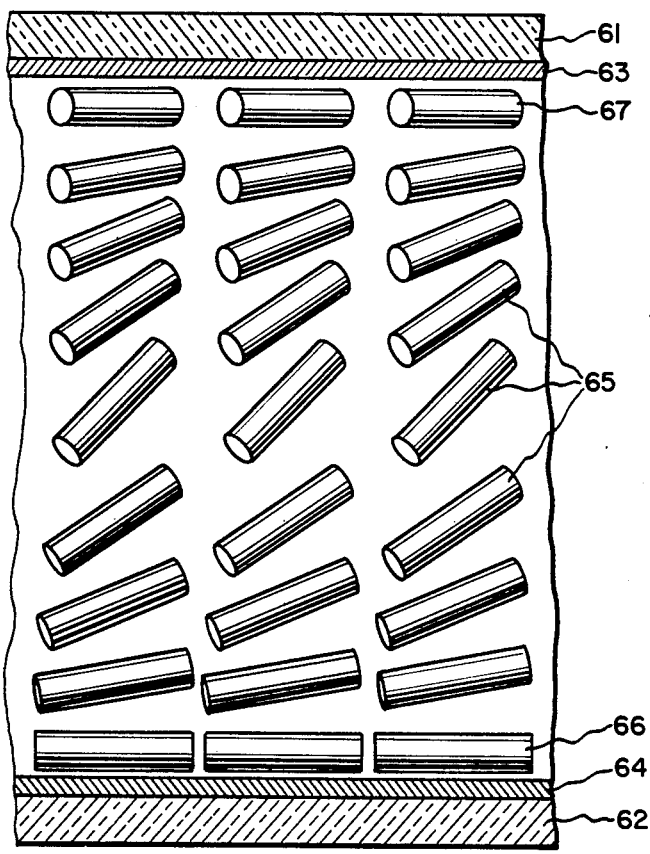
FIG. 7 illustrates the active state of the embodiment of FIG. 6.

The operation of the embodiment of FIG. 5 is somewhat similar to that of FIG. 1 and may best be understood by considering FIGS. 6 and 7. FIG. 6 illustrates the bulk condition of a positive dielectric anisotropy liquid crystal material in the quiescent state, while FIG. 7 illustrates the bulk characteristics of a positive dielectric anisotropy material in the active state.

The liquid crystal material is contained between two boundary substrates 61 and 62 having suitable transparent electrodes 63 and 64, respectively, formed thereon. The inner surfaces of substrates 61 and 62 are suitably treated to provide a preferred orientation or easy axis. As illustrated in FIGS. 6 and 7, the easy axes of substrates 61 and 62 are displaced 45° relative to each other. Specifically, the easy axis of substrate 62 is along a line parallel to the plane of the drawing and passing from left to right. The easy axis of substrate 61 is tilted with respect to the plane of the drawing so that the easy axis intersects the plane of the drawing as one proceeds from left to right. The angle of intersection is 45°.

Referring to FIGS. 5–7, incident light is polarized by polarizer 21 in a plane parallel to axis 13. In the active state, liquid crystal cell 14 transmits the light without rotation. This is due to the reorientation of the molecules in the bulk of the liquid crystal material, such as molecules 65, caused by the applied field, in a direction tending toward a parallel orientation with the applied field. This reorientation destroys the polarization rotation characteristic of the twisted molecular structure, even though the molecules at the boundary, such as molecules 66 and 67, remain in the homogeneous boundary state.

Quarter wave plate 22 converts the linearly polarized incident light to circularly polarized light which, as illustrated in FIG. 2, has the sense of rotation thereof reversed by reflector 25. Reflector 25 reflects the light back to quarter wave plate 22 which converts the circularly polarized light to linearly polarized light having the direction of polarization rotated 90° from the direction at which it left liquid crystal cell 14. Liquid crystal cell 14 transmits this light without rotation to polarizer 21. Due to the rotation by quarter wave plate 22, the light reflected to polarizer 21 has the direction of polarization thereof orthogonal to axis 13. Thus, the light is absorbed and the viewer sees a dark display.

It is generally preferable in the art to provide a dark display on a light or white background since such a display provides the impression of greater clarity than a white on black display. In addition, the black on white display conforms to esthetic values which dictate that a black on white display is preferred. In this regard, utilizing positive dielectric anisotropy material, the display of the present invention distinguishes from the reflective display described by I. A. Shanks in an article in Electronics Letters, Vol. 10, No. 7, pp. 90 and 91, Apr. 4, 1974, in which the orientation of one axis of the quarter wave plate is parallel to the easy axis of the entrance substrate of the liquid crystal cell.

In the quiescent state, as illustrated in FIG. 6, the 45° displaced homogeneous boundary conditions produce a 45° molecular twist in the nematic liquid crystal which rotates the light from polarizer 21 to an orientation parallel to axis 16 of quarter wave plate 22. Thus, the light remains linearly polarized and remains in the proper direction so that liquid crystal cell 14 reorients the reflected light parallel to axis 13. Thus, in the inactive state, the viewer sees a light or white display, depending upon the nature of reflector 25 and other parameters.

Having thus described the invention, it will be apparent to those of skill in the art that various modifications can be made within the spirit and scope of the present invention. For example, various techniques utilized in fabricating liquid crystal cells may be incorporated into the liquid crystal cell of the present invention. For example, it is known that wider viewing angles are obtainable by making the liquid crystal layer relatively thin, e.g., 8 microns. Other techniques, known in the art, may also be utilized.

What I claim as new and desire to secure by Letters Patent of the United States is:

1. A reflective liquid crystal display device comprising:
    polarizing means for transmitting light in a single polarization direction;
    reflecting means;
    a source of control signal;
    liquid crystal cell means and quarter wave plate means positioned between said polarizing means and said reflecting means and in optical contact therewith, said liquid crystal cell and said quarter wave plate coacting on incident light polarized parallel to said polarization direction for transmitting elliptically polarized light to said reflector, wherein said liquid crystal cell is coupled to said source and modulates said transmission in accordance with said control signal for displaying information and said liquid crystal cell comprises:
    a negative dielectric anisotropy liquid crystal material characterized by quasi-homeotropic boundary conditions having easy axes producing a twisted nematic structure in the bulk in the active state.

2. The reflective liquid crystal display device as set forth in claim 1 wherein said liquid crystal cell is positioned adjacent said polarizing means and said quarter wave plate means is positioned between said liquid crystal cell and said reflecting means.

3. The reflective liquid crystal display device as set forth in claim 2 wherein said liquid crystal material is characterized by a 45° molecular twist in the bulk in the active state.

4. The reflective liquid crystal display device as set forth in claim 3 wherein the easy axis of the boundary of said liquid crystal cell adjacent said polarizing means is parallel to said polarization direction.

5. The reflective liquid crystal display device as set forth in claim 4 wherein said quarter wave plate has one axis thereof parallel to said polarization direction.

6. The reflective liquid crystal display device as set forth in claim 5 wherein said reflective means comprises a metal layer on the surface of said quarter wave plate opposite said liquid crystal cell.

7. The reflective liquid crystal display device as set forth in claim 5 wherein said reflective means comprises:
   a light scattering layer on the surface of said quarter wave plate opposite said liquid crystal cell; and
   a metal layer on said light scattering layer.

8. The reflective liquid crystal display device as set forth in claim 4 wherein said quarter wave plate has the axes thereof oriented 45° from a line in the plane of said plate parallel to said polarization direction.

9. The reflective liquid crystal display device as set forth in claim 8 wherein said reflective means comprises a metal layer on the surface of said quarter wave plate opposite said liquid crystal cell.

10. The reflective liquid crystal display device as set forth in claim 8 wherein said reflective means comprises:
    a light scattering layer on the surface of said quarter wave plate opposite said liquid crystal cell; and
    a metal layer on said light scattering layer.

11. A reflective liquid crystal display device comprising:
    polarizing means for transmitting light in a single polarization direction;
    reflecting means;
    a source of control signal;
    liquid crystal cell means and quarter wave plate means positioned between said polarizing means and said reflecting means and in optical contact therewith, coacting liquid crystal cell and said quarter wave plate coactint on incident light polarized parallel to said direction for transmitting elliptically polarized light to said reflector, wherein
    said liquid crystal cell is coupled to said source and modulates said transmission in accordance with said control signal for displaying information;
    said liquid crystal cell comprises a positive dielectric anisotropy liquid crystal material characterized by boundary conditions having easy axes producing a 45° twisted nematic structure in the quiescent state; and
    said quarter wave plate means has the axes thereof oriented 45° from a line in the plane of said plate parallel to said polarization direction.

12. A reflective liquid crystal display device as set forth in claim 11 wherein the easy axis of the boundary of said liquid crystal cell adjacent said polarizing means is orthogonal to said polarization direction.

13. The reflective liquid crystal display device as set forth in claim 11 wherein the easy axis of the boundary of said liquid crystal cell adjacent said polarizing means is parallel to said polarization direction.

14. The reflective liquid crystal display device as set forth in claim 11 wherein said reflective means comprises a metal layer on the surface of said quarter wave plate opposite said liquid crystal cell.

15. The reflective liquid crystal display device as set forth in claim 14 wherein said reflective means comprises:
    a light scattering layer on the surface of said quarter wave plate opposite said liquid crystal cell; and
    a metal layer on said light scattering layer.

* * * * *